(12) United States Patent
Schultz et al.

(10) Patent No.: US 10,747,001 B2
(45) Date of Patent: Aug. 18, 2020

(54) DOUBLE-SIDED IMAGING LIGHT GUIDE WITH EMBEDDED DICHROIC FILTERS

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 201 days.

(21) Appl. No.: 16/067,998

(22) PCT Filed: Jan. 5, 2017

(86) PCT No.: PCT/US2017/012332
§ 371 (c)(1),
(2) Date: Jul. 3, 2018

(87) PCT Pub. No.: WO2017/120334
PCT Pub. Date: Jul. 13, 2017

(65) Prior Publication Data
US 2019/0011708 A1     Jan. 10, 2019

Related U.S. Application Data

(60) Provisional application No. 62/275,557, filed on Jan. 6, 2016.

(51) Int. Cl.
*G02B 27/01*     (2006.01)
*G02B 27/44*     (2006.01)
(Continued)

(52) U.S. Cl.
CPC ....... *G02B 27/0172* (2013.01); *G02B 6/0016* (2013.01); *G02B 6/0026* (2013.01);
(Continued)

(58) Field of Classification Search
CPC  G02B 27/141; G02B 27/1006; G02B 27/145; G02B 27/142; G02B 19/0028;
(Continued)

(56) References Cited

U.S. PATENT DOCUMENTS

2010/0214659 A1   8/2010   Levola
2013/0051730 A1   2/2013   Travers et al.
(Continued)

FOREIGN PATENT DOCUMENTS

CN    1425937 A    6/2003
CN    1764856 A    4/2006
(Continued)

OTHER PUBLICATIONS

International Search Report for International Application No. PCT/US2017/012332 dated Mar. 27, 2017.
(Continued)

*Primary Examiner* — William R Alexander
*Assistant Examiner* — Sharrief I Broome
(74) *Attorney, Agent, or Firm* — Thomas B. Ryan; Harter Secrest & Emery LLP

(57) ABSTRACT

An imaging light guide has a waveguide formed as a coated substrate having first and second surface coatings. A first in-coupling diffractive optic on the first coating directs diffracted light of a first wavelength range into the waveguide along a first direction. A second in-coupling diffractive optic on the second coating directs diffracted light of a second wavelength range into the waveguide along a second different direction. A first dichroic patch between the first surface of the substrate and the first surface coating for (a) transmitting the first wavelength range, (b) transmitting the second wavelength range through a range of incidence angles, and (c) reflecting the second wavelength range through a higher range of incidence angles. A second (Continued)

dichroic patch between the second surface of the substrate and the second surface coating for transmitting the second wavelength range and reflecting the first wavelength range.

12 Claims, 16 Drawing Sheets

(51) Int. Cl.
*G02B 6/34* (2006.01)
*F21V 8/00* (2006.01)
*G02B 5/18* (2006.01)
*G02B 5/32* (2006.01)

(52) U.S. Cl.
CPC .............. *G02B 6/34* (2013.01); *G02B 27/44* (2013.01); *G02B 5/32* (2013.01); *G02B 2005/1804* (2013.01); *G02B 2027/0114* (2013.01); *G02B 2027/0116* (2013.01); *G02B 2027/0123* (2013.01); *G02B 2027/0178* (2013.01)

(58) Field of Classification Search
CPC .. G02B 27/14; G02B 26/008; G02B 27/1013; G02B 5/208; G02B 5/26; G02B 19/0057; G02B 21/06; G02B 27/102; G02B 27/1073; G02B 5/18; G02B 5/201; G02B 6/4215; G02B 27/0905; G02B 27/30; G02B 1/11; H01S 5/4012; H01S 5/141; H01S 5/4087; H01S 3/09415; H01S 5/4062; H01S 3/094053; H01S 3/2383; H01S 5/005; H01S 2301/03; H01S 3/005; H01S 3/08; H01S 3/08059; H01S 3/09408; H01S 3/0941; H01S 3/2391; H01S 5/0057; H01S 5/0078; H01S 5/02248; H01S 5/02284; H01S 5/405; G03B 21/204; G03B 33/12; G03B 21/2033; G03B 21/2066; G03B 21/20; G03B 21/2013; G03B 21/008; G03B 21/14; G03B 21/208; G03B 21/28; G03B 11/00; G03B 15/03; G03B 21/005; G03B 21/006; G03B 21/2073; G03B 27/14; G03B 33/08; G03B 33/10; G03B 35/08; G01N 15/1459

See application file for complete search history.

(56) References Cited

U.S. PATENT DOCUMENTS

| | | | |
|---|---|---|---|
| 2013/0242392 A1* | 9/2013 | Amirparviz | G02B 27/0172 359/485.05 |
| 2014/0300966 A1* | 10/2014 | Travers | G02B 6/0035 359/558 |
| 2015/0205126 A1 | 7/2015 | Schowengerdt | |
| 2015/0277123 A1 | 10/2015 | Chaum et al. | |
| 2015/0346490 A1 | 12/2015 | Tekolste et al. | |
| 2017/0075119 A1* | 3/2017 | Schultz | G02B 6/006 |
| 2017/0357090 A1* | 12/2017 | Martinez | G02B 27/0172 |
| 2018/0088325 A1* | 3/2018 | Brown | G02B 27/0103 |
| 2018/0143449 A1* | 5/2018 | Popovich | G02B 27/48 |

FOREIGN PATENT DOCUMENTS

| | | |
|---|---|---|
| CN | 101636677 A | 1/2010 |
| CN | 101688977 A | 3/2010 |
| CN | 104025121 A | 9/2014 |
| CN | 104040410 A | 9/2014 |
| CN | 104777535 A | 7/2015 |
| CN | 104903774 A | 9/2015 |
| CN | 104145208 A | 3/2017 |
| EP | 2196729 A1 | 6/2010 |
| JP | 2004212188 A | 7/2004 |
| JP | 2009186794 A | 8/2009 |
| JP | 2015053163 A | 3/2015 |
| JP | 2015194550 A | 11/2015 |
| JP | 2017524962 A | 8/2017 |
| WO | 2009126264 A2 | 10/2009 |

OTHER PUBLICATIONS

International Written Opinion for International Application No. PCT/US2017/012332 dated Mar. 27, 2017.

* cited by examiner

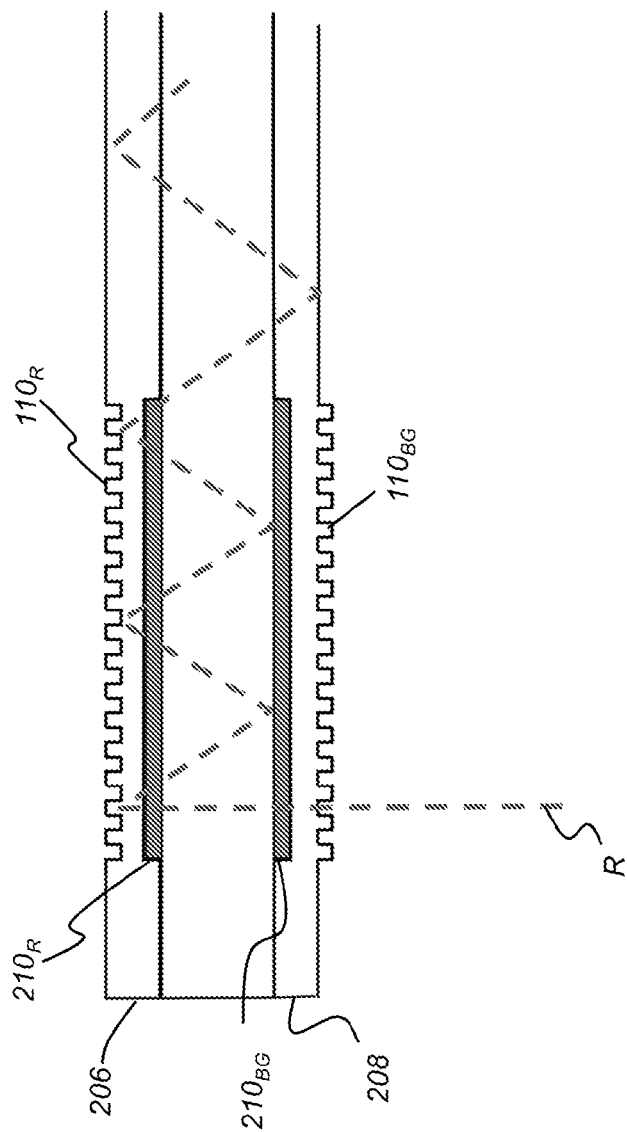

DOUBLE-SIDED IMAGING LIGHT GUIDE WITH EMBEDDED DICHROIC FILTERS

TECHNICAL FIELD

This invention generally relates to optical light guides for conveying image-bearing light in multiple color channels to a viewer particularly for use in video eyewear or augmented or virtual reality near-eye displays.

BACKGROUND OF THE INVENTION

Head-Mounted Displays (HMDs), which include near eye displays in a form resembling conventional eyeglasses or sunglasses, are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Light guides incorporating various types of waveguides, relay image-bearing light to a viewer in a narrow space, acting as exit-pupil expanders for redirecting the virtual image to the viewer's pupil and enabling this superposition function.

In the conventional light guide, collimated angularly related light beams from an image source are coupled into the light guide substrate, generally referred to as a waveguide, by an input optical coupling such as an in-coupling diffraction grating, which can be formed on a surface of the substrate or buried within the substrate. Other types of diffractive optics could be used as input couplings, including diffractive structures formed of alternating materials of variable index such as holographic polymer dispersed liquid crystal (HPDLC) or volume holograms. The diffractive optics could also be formed as surface relief diffraction gratings. The collimated light beams can be directed out of the waveguide by a similar output optical coupling, which can also take the form of a diffractive optic. The collimated angularly related beams ejected from the waveguide overlap at an eye relief distance from the waveguide forming an exit pupil within which a virtual image generated by the image source can be viewed. The area of the exit pupil through which the virtual image can be viewed at the eye relief distance is referred to as an "eyebox."

The output coupling can also be arranged for enlarging the exit pupil. For example, the collimated beams can be enlarged in one dimension by offsetting partially reflected portions of the collimated beams in a direction at which the collimated beams propagate along the output coupling or by ejecting collimated beams of different angles from different positions along the waveguide to more efficiently overlap the collimated beams at the eye relief distance from the waveguide.

A so-called "turning optic" located along the waveguide between the input coupling and the output coupling, can be used for expanding pupil size in a second dimension. The expansion can be effected by offsetting reflected portions of the collimated beam to enlarge a second dimension of the beams themselves or by directing the collimated beams to different areas of the output coupling so the collimated beams of different angles are ejected from different positions to more efficiently overlap within the eyebox. The turning optic can also take the form of a diffractive optic and, especially when located between the diffraction gratings of the input coupling and output coupling, can also be referred to as an intermediate grating.

Although conventional light guide mechanisms have provided a significant reduction in bulk, weight, and overall cost of display optics, there are still issues to resolve. Suitable separation of color channels is need in order to prevent cross-talk, in which color is processed and displayed from the wrong color channel. Cross-talk can lead to disparity between the color image data and the displayed color, and can also be a cause of objectionable color shifts, perceptible across the image field. Attempts to correct this problem have included stacking approaches in which multiple waveguides are stacked together with optional filters to prevent color from being directed to the wrong channel. Stacking, however, leads to thicker devices, adds weight, reduces brightness, and has not provided highly satisfactory results.

Thus, it can be appreciated that there is a need for improved designs that still provide the pupil expansion capabilities of the optical light guide, but allow these devices to be thinner and more lightweight, without compromising image quality and color balance.

SUMMARY OF THE INVENTION

It is an object of the present disclosure to advance the art of image presentation when using compact head-mounted devices and similar imaging apparatus. Advantageously, embodiments of the present disclosure provide an improved double-sided beam expander capable of handling two color channels within a single thickness of substrate.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an imaging light guide including a waveguide formed as a substrate having a first surface with a first surface coating and a second surface opposite the first surface and having a second surface coating. A first input coupling (in-coupling) diffractive optic is formed on the first surface coating and oriented to direct a first beam of diffracted light of a first wavelength range into the waveguide in a first direction. A second input coupling (in-coupling) diffractive optic is formed on the second surface coating and oriented to direct a second beam of diffracted light of a second wavelength range into the waveguide in a second different direction. A first dichroic patch is located between the first surface of the substrate and the first surface coating and is formed to (i) transmit light of the first wavelength range, (ii) transmit light of the second wavelength range through a limited range of incidence angles, and (iii) reflect light of the second wavelength range through a higher range of incidence angles. A second dichroic patch is located between the second surface of the substrate and the second surface coating and is formed to transmit light of the second wavelength range and to reflect light of the first wavelength range.

The first dichroic patch preferably transmits light of the second wavelength range at incidence angles centered about zero degrees, preferably less than about 15 degrees, and reflects light of the second wavelength range at incidence angles in a higher range, preferably greater than 40 degrees, that supports total internal reflection along the waveguide.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

FIG. 9A is a side view that shows the input end of the light guide managing a red color channel by dichroic patches.

DETAILED DESCRIPTION OF THE INVENTION

Figure 1:
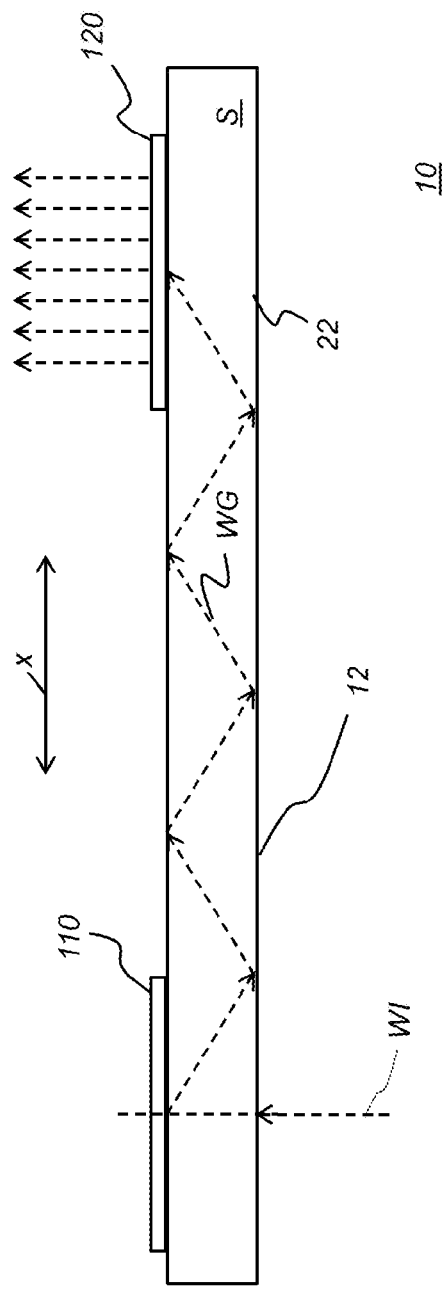
FIG. 1 is a schematic diagram that shows a simplified cross-sectional view of one possible configuration of a light guide arranged as waveguide incorporating a monocular type diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the terms "wavelength band" and "wavelength range" are equivalent and have their standard connotation as used by those skilled in the art of color imaging and refer to a range of light wavelengths that are used to form one or more colors in polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

FIG. 1 is a schematic diagram that shows a simplified cross-sectional view of one conventional configuration of a light guide 10 arranged as a monocular type light diffractive beam expander or exit pupil expander comprising an input coupling element such as an in-coupling diffractive optic 110, and an output coupling element, such as an out-coupling diffractive optic 120 arranged on a transparent and planar waveguide 22 having a substrate S. In this example, in-coupling diffractive optic 110 is shown as a reflective type diffraction grating; however, in-coupling diffractive optic 110 could alternately be a transmissive diffraction grating, volume hologram or other holographic diffraction element, or other type of optical component that provides diffraction for the incoming, image-bearing light, arranged on a lower surface 12 of the waveguide substrate S, where the incoming light wave WI first interacts with the waveguide substrate S.

When used as a part of a virtual display system, in-coupling diffractive optic 110 couples each of a plurality of angularly related in-coming image-bearing light beams WI from an imager, via suitable front end optics (not shown), into the substrate S the waveguide 22. The input light beams WI are diffracted by in-coupling diffractive optic 110. For example, first order diffracted light propagates as an angularly related set of beams WG along the substrate S, moving toward the right in the FIG. 1 system, toward out-coupling diffractive optic 120. Between gratings or other types of diffractive optics, light is channeled or directed along the waveguide 22 by Total Internal Reflection (TIR). Out-coupling diffractive optic 120 contributes to beam expansion via multiple diffractive encounters with the propagating light beams WG along its length, i.e., along the x-axis in the view of FIG. 1, and directs the diffracted light from each encounter outwards towards the intended location of an observer's eye.

Figure 2:
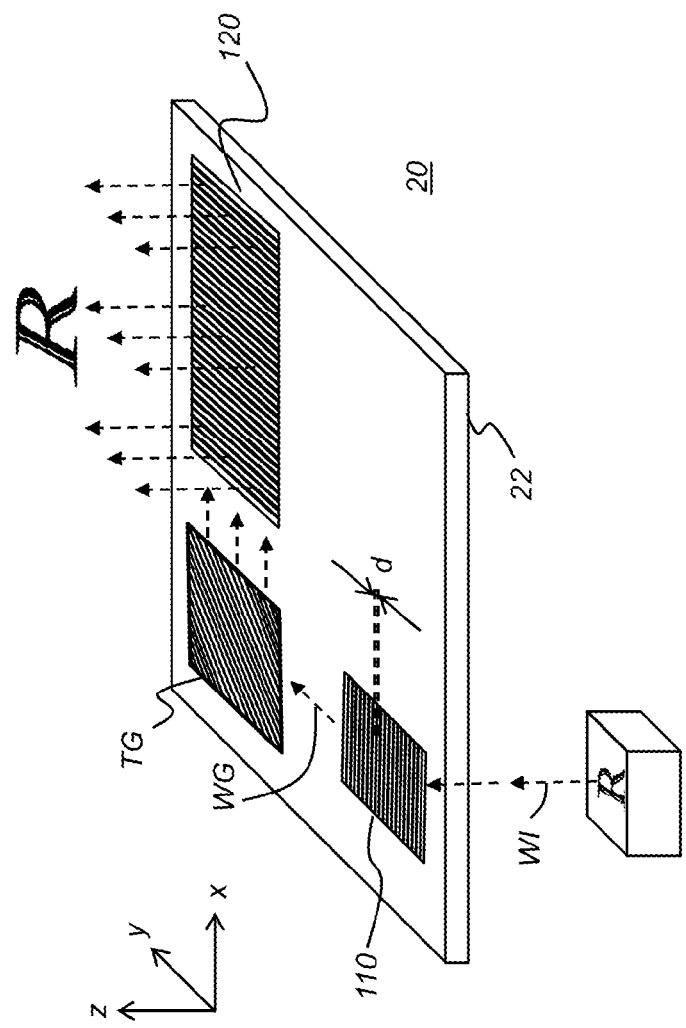
FIG. 2 is a perspective view that shows a light guide arranged as waveguide incorporating a diffractive beam expander including a turning grating.

The perspective view of FIG. 2 shows an imaging light guide 20 arranged as a known beam expander that provides beam expansion along x- and y-axes using an intermediate turning grating TG to redirect the light output (first diffracted mode) from in-coupling diffractive optic 110 to out-coupling diffractive optic 120. In the FIG. 2 device, in-coupling diffractive optic 110 containing periodic rulings with a period d diffracts angularly related incoming input optical beams WI into the waveguide 22 as a set of angularly related beams WG, propagating by total internal reflection in an initial direction towards the intermediate turning grating TG. Intermediate grating TG is termed a "turning grating" because of its function in the optical path, redirecting the beams WG from within the waveguide 22 according to its grating vector in a direction towards the out-coupling diffractive optic 120, thereby accounting for a difference in angle between the grating vectors of the in-coupling diffraction optic 110 and the out-coupling diffraction optic 120. Intermediate grating TG, which has angular orientation of diffraction elements and a spacing geometry determined by spacing period d, not only redirects the internally reflected beams WG but also contributes to beam expansion via multiple diffractive encounters with the light beams WG along the initial direction of propagation, i.e., along the y-axis in the view of FIG. 2. The out-coupling diffractive optic 120 contributes to an orthogonal beam expansion via multiple diffractive encounters with the light beams WG along the redirected direction of propagation, i.e., along the x-axis in the view of FIG. 2.

The grating vectors, generally designated k and shown with subscripts where they are specific to light within a color channel, extend parallel to the plane of the waveguide surface and are in the direction of the periodicity of the in-coupling and out-coupling diffractive optics 110 and 120, respectively.

In considering a light guide design used for imaging it should be noted that image-bearing light traveling within a waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer.

A turning grating TG, placed at an intermediate position between the input and output couplings, such as the in-coupling and out-coupling diffractive optics 110 and 120, is typically chosen to minimize any changes on the encoded light. As such, the pitch of the turning grating preferably matches the pitch of the in-coupling and out-coupling diffractive optics 110 and 120. In addition, the virtual image can be preserved by orienting the turning grating at around 60 degrees to in-coupling and out-coupling diffractive optics 110 and 120 in such a way that the encoded ray bundles are turned 120 degrees by one of the 1st reflection orders of the turning grating TG. The diffractive effects of the turning grating TG are most pronounced on the vector component of the incoming rays that are parallel to the grating vector of the turning grating. Turning gratings so arranged redirect ray bundles within the guide substrate while minimizing any changes to the encoded angular information of the virtual image. The resultant virtual image in such a designed system is not rotated. If such a system did introduce any rotation to the virtual image, the rotational effects could be non-uniformly distributed across different field angles and wavelengths of light, thus causing unwanted distortions or chromatic aberrations in the resultant virtual image.

The use of turning grating TG as envisioned for certain embodiments described herein preserves an inherent geometrical accuracy to the design of the light guide 20 so that the input beam and output beam are symmetrically oriented with respect to each other. With proper grating TG spacing and orientation, grating vectors k direct the light from the in-coupling diffractive optic 110 to the out-coupling diffractive optic 120. It should be noted that the image that is formed for the imaging light guide viewer is a virtual image, focused at infinity or at least well in front of the light guide 20, but with the relative orientation of output image content to input image content preserved. A change in the rotation about the z axis or angular orientation of incoming light beams WI with respect to the x-y plane can cause a corresponding symmetric change in rotation or angular orientation of outgoing light from out-coupling diffractive optic (ODO) 120. From the aspect of image orientation, turning grating TG is intended to function as a type of optical relay, providing expansion along one axis of the image that is input through the in-coupling diffractive optic (IDO) 110 and redirected to out-coupling diffractive optic (ODO) 120. Turning grating TG is typically a slanted or square grating or, alternately, can be a blazed grating. Reflective surfaces can alternately be used for turning the light toward the out-coupling diffractive optic 120.

Beam expansion in two different dimensions is provided when using the arrangement of FIG. 2. Turning grating TG expands the diffracted beam from in-coupling diffractive optic 110 in the y direction as shown. Out-coupling diffractive optic 120 further expands the diffracted beam in the x direction, orthogonal to the y direction as shown.

The known imaging light guide 20 that is shown in FIG. 2 has been used in a number of existing head-mounted device (HMD) designs for providing image content to a viewer. This type of beam expander is particularly well-suited to augmented reality applications in which image content can be superimposed on a real-world view as seen through the transparent imaging light guide.

One acknowledged shortcoming of the known imaging light guide beam expander relates to color quality. By design, a diffraction grating is optimized for a particular wavelength, with progressively degrading imaging performance as wavelengths deviate further from the specified wavelength. Moreover, not only does performance shift according to wavelength, but changes in incident angle have more pronounced effects that vary with wavelength differences. Because of this, undesirable color shifts can be perceived across an image field when using the known type of diffractive beam expander. The color shift problem proves extremely difficult to compensate for in software, since the amount of color shift can vary widely across the image field.

One approach for addressing the color shift problem is using separate waveguides to serve the different primary color channels, with diffraction elements suitably designed for handling light of different wavelength bands. One proposed approach stacks of multiple waveguides to effect beam expansion. Stacking can be used to delegate the separate red (R), blue (B), and green (G) color channels to individual waveguides, wherein the diffractive components for each waveguide are designed suitably for light of different wavelength bands. Cross-talk between color channels is reduced using stacked waveguides with separate diffraction gratings and optional color filters.

While stacking approaches can achieve some measure of channel separation, the added weight, size, complexity, and cost of stacked waveguide solutions can be significant. It can readily be appreciated that solutions that would provide separate color channels within a single waveguide, without appreciable color channel crosstalk, would be advantageous for helping to reduce color shifts and improve color quality overall.

Double-Sided Imaging Light Guide

Figure 3A:
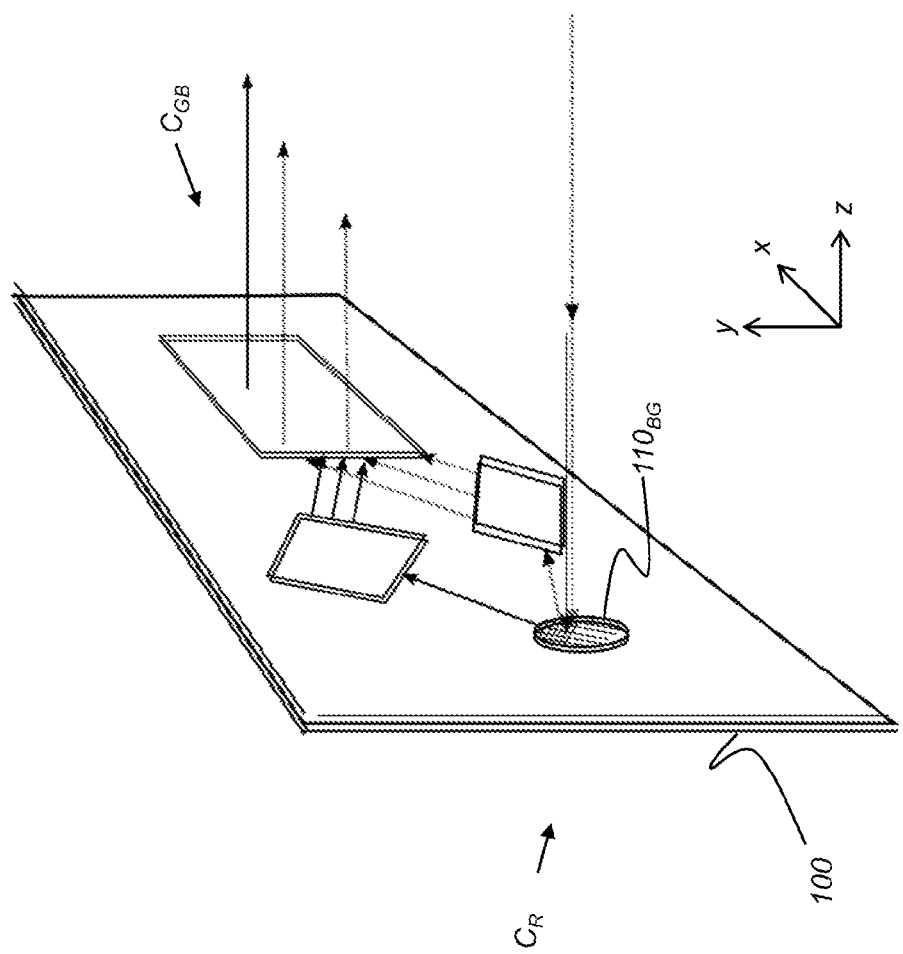
FIG. 3A is a perspective view that shows a light guide arranged as waveguide incorporating a double-sided diffractive beam expander.

FIG. 3A is a perspective view that shows an embodiment of an imaging light guide 100 having two color channels $C_R$ and $C_{BG}$ and formed on a single substrate. Color channels $C_R$ and $C_{BG}$ can be centered at wavelengths that are at least 50 nm apart, for example. Imaging light guide 100 is formed as a double-sided diffractive beam expander, eliminating the need for stacked waveguide solutions in order to reduce color channel crosstalk. Image-bearing light for both color channels is incident on an in-coupling diffractive optic $110_{BG}$ that diffracts the light of one of two color channels into the light guide 100.

Figure 3B:
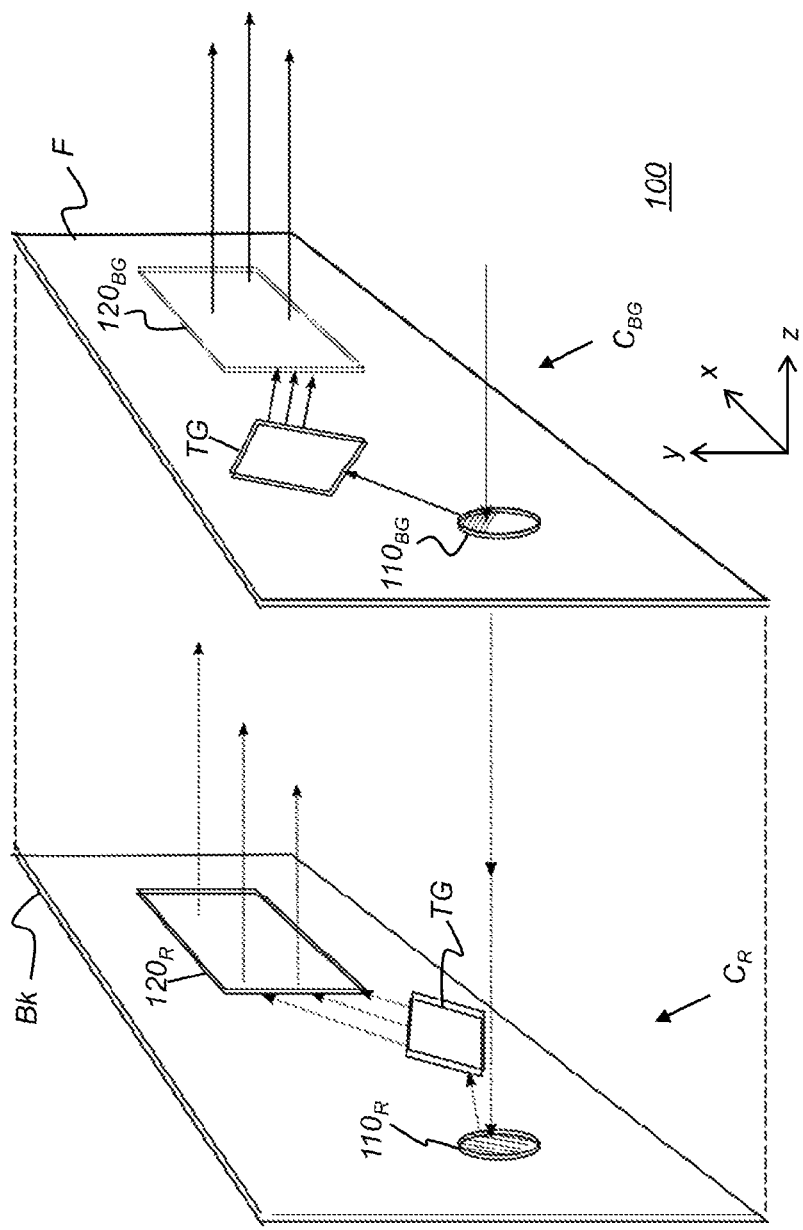
FIG. 3B is an exploded view of the FIG. 3A embodiment showing the distribution of components for two different color channels on front and back surfaces of the waveguide.

FIG. 3B is an exploded view that shows an embodiment of an imaging light guide 100 of FIG. 3A having two color channels and formed on a single waveguide substrate S. The exploded view visually separates the front and back surfaces F and Bk, respectively, of the substrate S from each other. It must be emphasized that there is only a single waveguide of substrate S; each surface of the substrate S has the diffractive structures that serve one of the two color channels. Components shown on the right (front surface F) portion are primarily for one channel; components shown on the left (back surface Bk) are for a second channel. In the example shown, one color channel $C_{BG}$ is provided for green and blue light (from about 450-550 nm); a second color channel $C_R$ is provided for red light (from about 610-780 nm). Color channel $C_{BG}$ has diffractive elements $110_{BG}$, $120_{BG}$ and $TG_{BG}$ formed on a coating that lies against the front surface F of substrate S. Color channel $C_R$ has diffraction elements $110_R$, $120_R$ and $TG_R$ formed on a coating that is applied onto the rear or back surface Bk of substrate S. For the respective color channels, the in-coupling diffractive optics $110_R$ and $110_{BG}$ align with each other along a common normal to the parallel front and back surfaces F and Bk. Similarly, the out-coupling diffractive optics $120_R$ and $120_{BG}$ also align along a common normal to the front and back surfaces F and Bk. The respective turning gratings $TG_R$, $TG_{BG}$ are not similarly aligned.

It should be noted that any of a number of arrangements of color channels and their associated bandwidth ranges can be used, such as including green and red wavelength bands within one color channel and blue wavelength bands in another color channel.

Cross-Talk Concerns

Cross-talk between color channels can be a problem with any type of imaging system, including arrangements using multiple stacked waveguides, but is a particular concern for designs using a single waveguide. One approach for defeating crosstalk separates the optical paths within the light guide as much as is possible, both in terms of angle and of distance. For the example, as shown in FIGS. 3A and 3B, the path of the red light in color channel $C_R$ is separated from the path of the blue-green light in color channel $C_{BG}$ by both angle and distance, so that "leakage" of light to the wrong color path does not occur or is negligible. Although this goal is straightforward, conventional methods for achieving this goal have not been highly successful. Embodiments of the present disclosure, however, provide methods for color channel separation that make it possible to design and use a pupil expander formed on a single substrate.

Figure 4A:
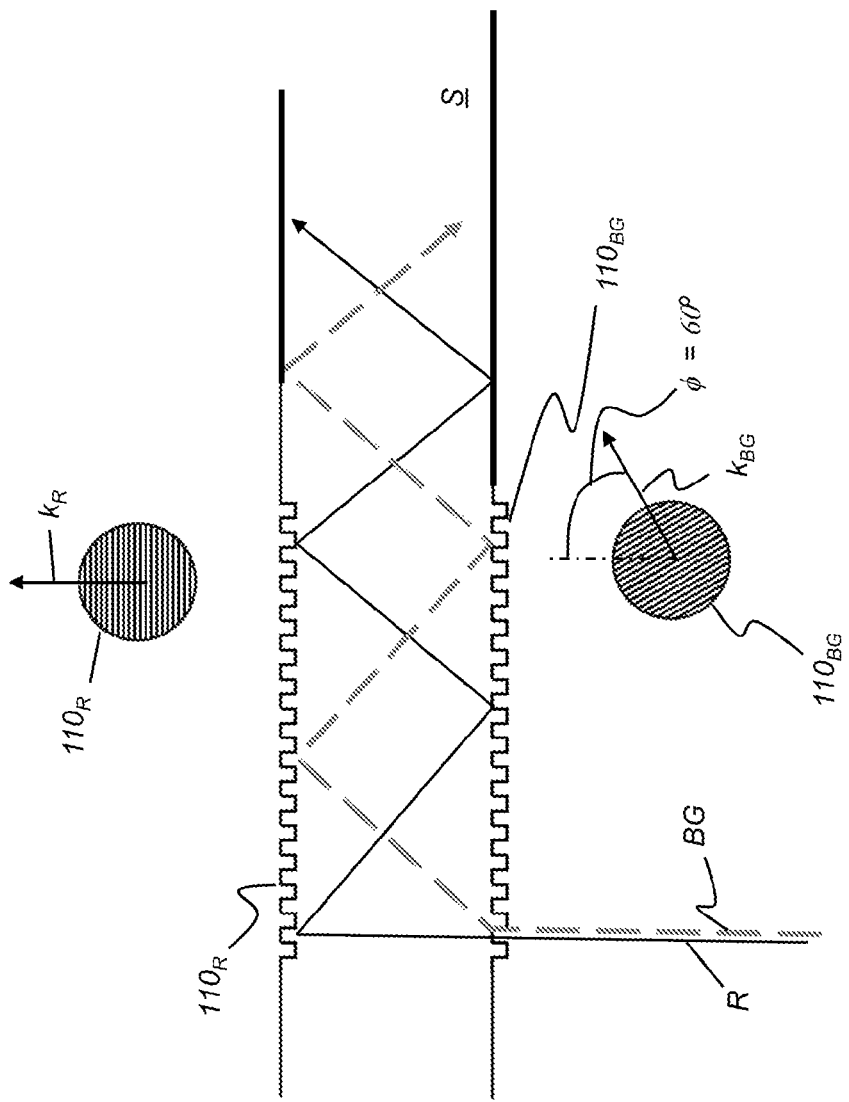
FIG. 4A is a side view that shows the input end of the light guide with opposing in-coupling diffractive optics for a double-sided diffractive beam expander. Respective grating orientations are illustrated in a plan view.

For a better understanding of the solutions proposed herein, it is instructive to examine the behavior of different parts of the optical system in light of the cross-talk prevention strategy outlined above. FIG. 4A is a side view that shows the arrangement and behavior of in-coupling diffractive optics $110_{BG}$ and $110_R$. Blue/green light, shown by a dashed line BG, is diffracted by in-coupling diffractive optic $110_{BG}$ into the waveguide substrate S and propagates within the substrate S via TIR. A portion of this light reflects from in-coupling diffractive optic $110_R$ and also reflects from in-coupling diffractive optic $110_{BG}$ as it moves along the substrate. Red light, indicated by a solid line R, transmits through in-coupling diffractive optic $110_{BG}$ and is diffracted, in reflection, by in-coupling diffractive optic $110_R$ for propagation within the substrate S via TIR.

Figure 4B:
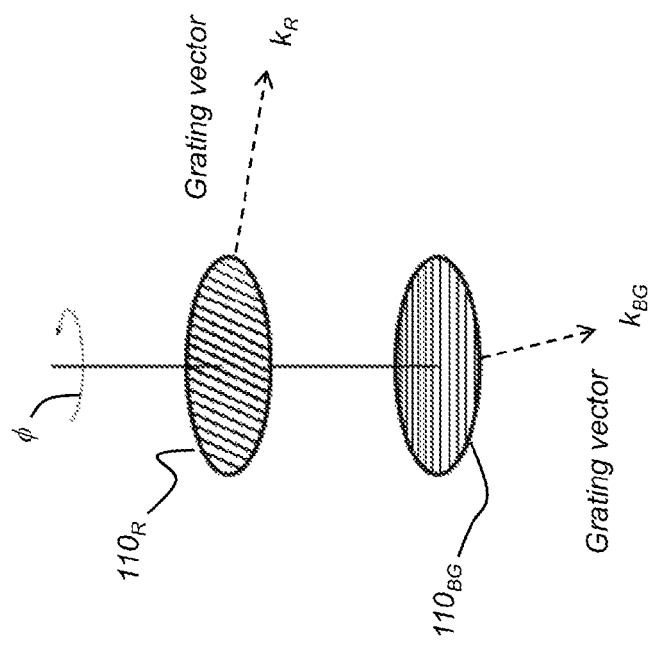
FIG. 4B is a perspective view that shows the relative rotational orientations of the in-coupling diffractive optics for the two different color channels and their corresponding grating vectors.

Because it is a side view, FIG. 4A cannot show the angular difference between light diffracted from each in-coupling 110 in the plane of substrate S. Returning for a moment to the perspective view of FIG. 3B, it can be seen that the R and the BG light beams trace different paths from in-couplings $110_R$ and $110_{BG}$, according to grating rotation. In FIGS. 4A and 4B, grating rotation, corresponding to the angular distance between grating vectors $k_R$ and $K_{BG}$, is represented by a rotation angle $\phi$, shown in top view relative to the upper and lower in-coupling diffractive optics $110_{BG}$ and $110_R$ in FIG. 4A and in perspective view in FIG. 4B.

The grating direction, corresponding to the grating vectors $k_R$ and $k_{BG}$, determines the path of light that is diffracted by each in-coupling diffractive optic $110_R$ and $110_{BG}$. Peak separation between paths is achieved when the paths of the R and BG light beams are orthogonal to each other; this maximum path separation occurs when rotation angle $\phi$ is at or very near 90 degrees. As angle $\phi$ decreases from 90 degrees, entry of light into the wrong path and resulting cross-talk become increasingly more likely.

In each color channel $C_{BG}$ and $C_R$, the respective turning grating $TG_{BG}$ and $T_{GR}$ redirect incident light from the waveguide at a nominal 60 degree angle. The turning gratings $TG_{BG}$ and $T_{GR}$ are designed and oriented specifically to provide this behavior and generally operate to accept diffracted light input and provide redirected light output at this comparatively fixed angle.

Out-coupling diffractive optics $120_{BG}$ and $120_S$ that face each other (formed on opposite surfaces along a common normal) provide best performance with input light that is orthogonal. Out-coupling diffractive optics $120_{BG}$ and $120_R$ then have their relative grating angles at orthogonal to each other. At the out-coupling optics $120_{BG}$ and $120_R$, the likelihood of color channel cross-talk increases as grating angles and incident angles diverge from orthogonal.

The geometric constraints on respective angles needed for best performance of in-coupling and out-coupling diffraction gratings, as outlined above, cannot be met without making at least some type of compromise. The turning grating, for example, provides some small degree of adjustability for turning angle $\theta$, based on the pitch $P_{new}$, which can be generally computed based on the input pitch $P_{input}$, using:

$P_{new} = P_{input}(2 \cos \theta)$

Thus, for turning light from an in-coupling diffractive grating 110 having a 350 nm pitch, a turning grating TG having a 305 nm pitch would be required to provide a turning angle $\theta$ of 55 degrees. Achieving a smaller turn angle would require a very high pitch that might easily be too difficult or costly to fabricate. For example, a 272 nm pitch grating would be required for a turning angle $\theta$ of 50 degrees. Thus, although it can be possible to adjust the turning angle by a few degrees, it is far more practical to make some adjustment to the rotational angle $\phi$ between in-coupling diffractive optic 110 and out-coupling 120 diffractive optic, to angles less than the ideal orthogonal angle.

Figure 5:
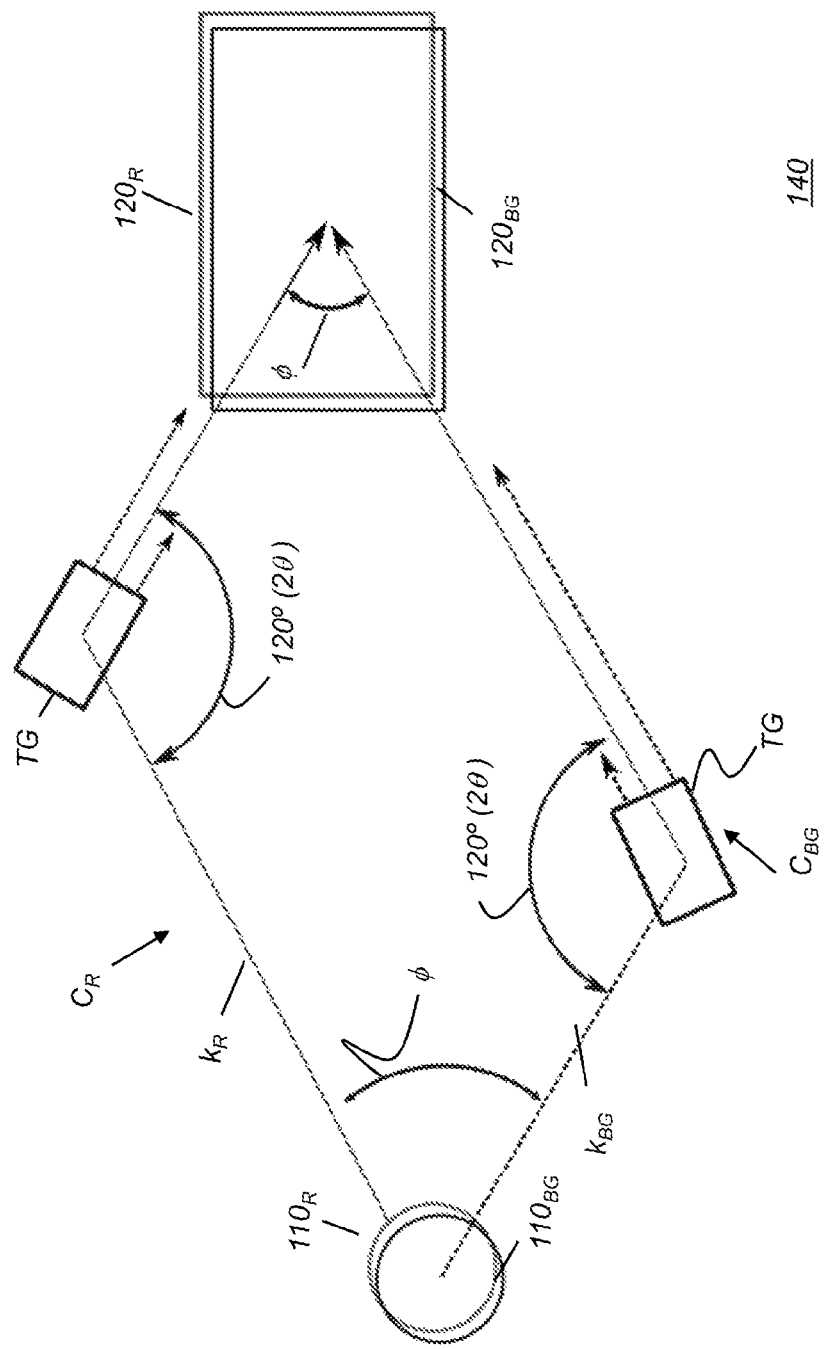
FIG. 5 is a top view that shows a lay out of components of a double-sided light guide according to one approach for maintaining a high rotational angle to separate color channels.

Adjusting the gratings rotation angles so that components fit within the conventional waveguide footprint and so that rotation angles for facing diffraction gratings differ by the largest possible angle yields the beam expander 140 design shown in FIG. 5. Overlaying or facing gratings are shown as slightly offset for clarity; in practice, facing in-coupling and out-coupling optics are precisely aligned with each other, as described previously. Here, angle $\phi$ between gratings rotations for in-coupling diffractive optics $110_{BG}$ and $110_R$ is 60 degrees. Out-couplings $120_{BG}$ and $120_R$ have their grating vectors similarly rotated with respect to each other by 60 degrees in the plane of the waveguide.

The arrangement shown in FIG. 5 is workable and provides a two-channel solution on a single substrate. Color channel crosstalk with this arrangement, however, is still clearly perceptible, indicating that the color paths inadvertently "leak" into each other even at the relatively high gratings rotation angles that are used. The persistence of color crosstalk with the configuration of FIG. 5 strongly suggests that further compromising the desired angular rotations would be undesirable.

Figure 6:
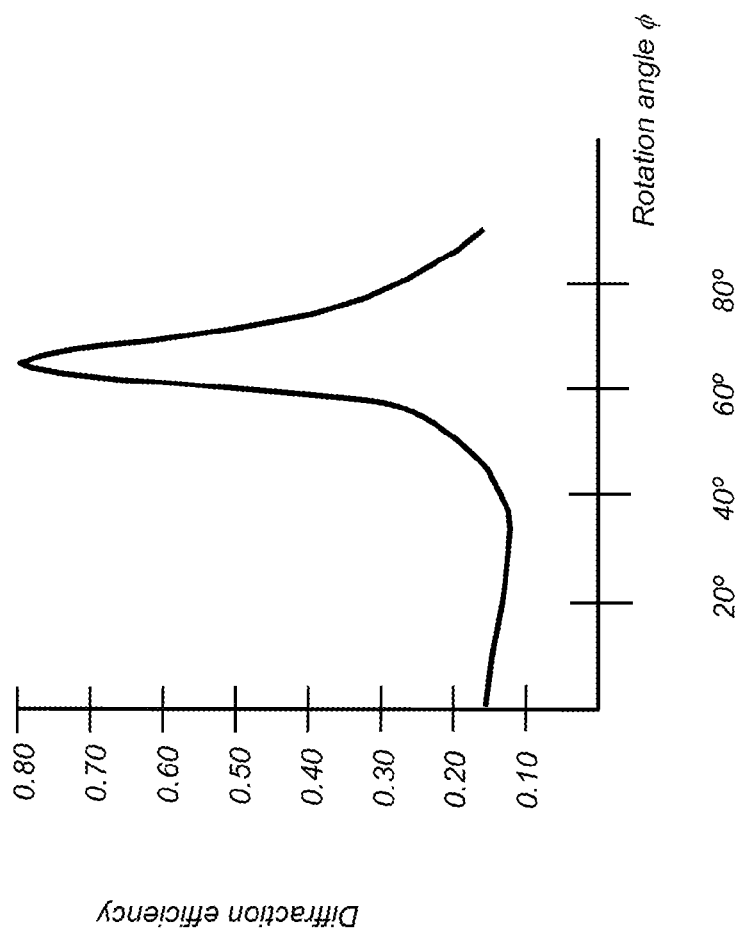
FIG. 6 is a graph that shows the relationship of rotational angle to diffraction efficiency for light moving through the waveguide at oblique angles.

The graph of FIG. 6 shows characteristic behavior for first-order reflective diffraction from a diffraction grating designed for Red light with grating spacing slightly smaller than red wavelengths, here about 510 nm. Diffraction efficiency is plotted against rotational angle $\phi$ for incident blue light at 475 nm at an approximately 40 degree incidence angle, as the light beams would be traveling through the waveguide substrate with TIR. This graph shows a general behavior characteristic that is used for turning gratings TG. In addition to this, the graph of FIG. 6 also suggests that one contributor to color channel cross-talk at particular incidence angles may be the in-coupling diffractive optics themselves.

When the diffraction gratings of in-coupling diffractive optics $110_{BG}$ and $110_R$ are rotated so that angle $\phi$ is below about 40 degrees, diffraction efficiency is less than 20% so that very little first-order diffraction of light at 40 degree angular incidence occurs. When this is the case, blue/green incident light beams at 40 degrees can simply reflect from the Red in-coupling $110_R$ grating surface, as in conventional TIR. As rotation angle $\phi$ increases above 50 degrees, however, first order reflective diffraction increases dramatically. At 60 degrees, first-order reflective diffraction approaches a maximum, at nearly 75% for a target wavelength.

Notably, FIG. 6 shows behavior for light incident at TIR angles (exceeding 40 degree incidence). As noted above, this same effect is used for design of a turning grating TG. However, an undesirable turning grating effect can also occur in the in-coupling region of the waveguide, between in-coupling diffractive optics $110_R$ and $110_{BG}$. Where this unintended effect occurs, it may cause one or the other in-coupling diffractive optics to behave as a turning grating for light from the opposite in-coupling diffractive optic instead of allowing TIR. At efficiencies close to 80%, the opposing in-coupling then begins diverting light from its intended TIR path and re-directing some of the diverted light into the path intended for the opposite color channel. That is, red light is now inadvertently coupled into the blue-green light path and vice-versa.

Figure 7:
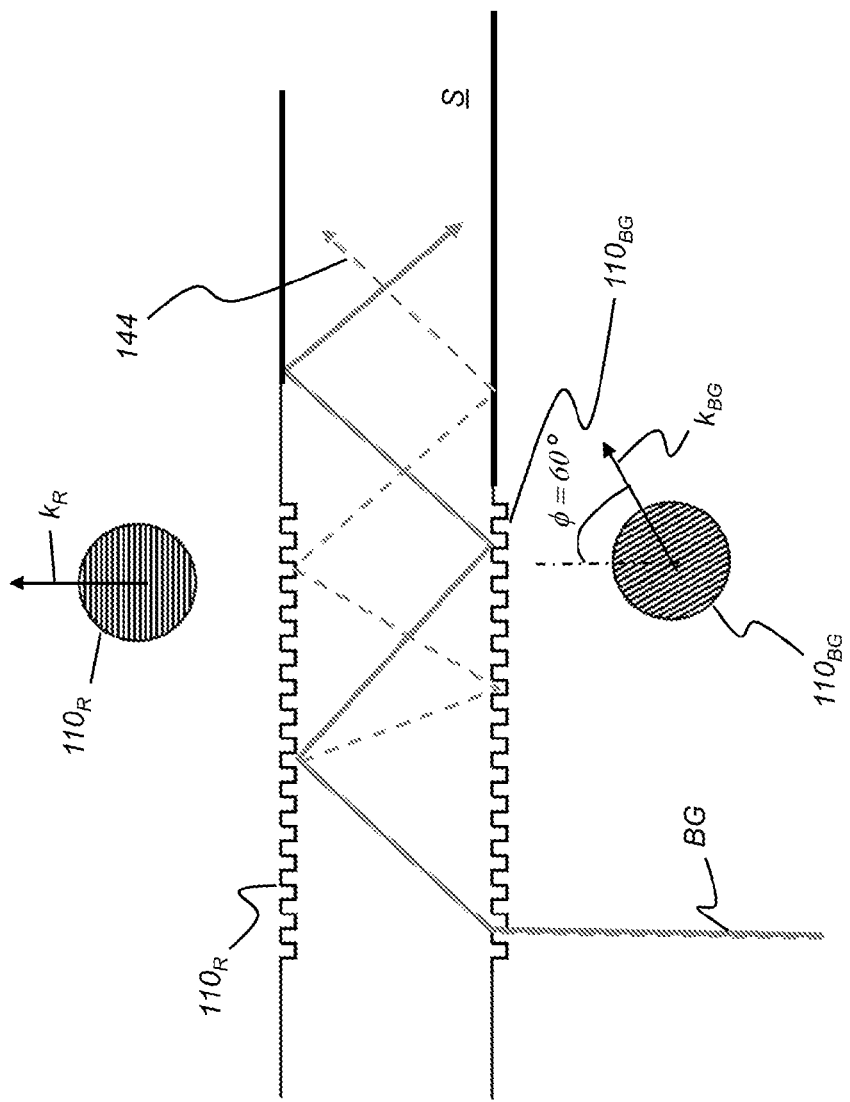
FIG. 7 is a side view that shows the input end of the light guide with opposing in-coupling diffractive optics for a double-sided diffractive beam expander also showing the effects of unintended diffraction of a beam by the opposite color channel at this point.

FIG. 7 shows this problem schematically for blue-green light BG. The intended path of this BG light is shown in solid line. The path for red light is omitted for clarity. A second BG light path 144, shown in dashed line format, indicates that some of the BG light that should be reflected from in-coupling diffractive optic $110_R$ has now been diffracted instead, and unintentionally diverted to the red light path. Thus, with in-coupling diffractive optics $110_R$ and $110_{BG}$ at a relatively high rotation angle, e.g., $\phi=60$ degrees, a high degree of color crosstalk can be observed. This same effect can be true also for Red light that is incident on the in-coupling diffractive optic $110_{BG}$, effectively diverting some Red light to the blue-green path.

Thus, from what is shown in FIG. 7, it can be appreciated that one source of color channel crosstalk that can prove to be particularly troublesome is light interaction at the in-coupling diffractive optics $110_R$ and $110_{BG}$. Some of the light incident on each diffraction grating is inadvertently diffracted into the opposite color channel. Providing proper rotation of the respective input/output gratings can help to reduce the crosstalk problem but can also present constraints that can be difficult or unworkable in some cases. Embodiments of the present disclosure address the problem of cross-talk resulting from light interaction between the in-coupling diffractive optics $110_R$ and $110_{BG}$ by constructing the imaging light guide with dichroic coatings whose angular characteristics are tuned to reflect and transmit light differently according to both wavelength and incidence angle. Light of the same wavelength may be selectively transmitted or reflected according to its incident angle.

Figure 8A:
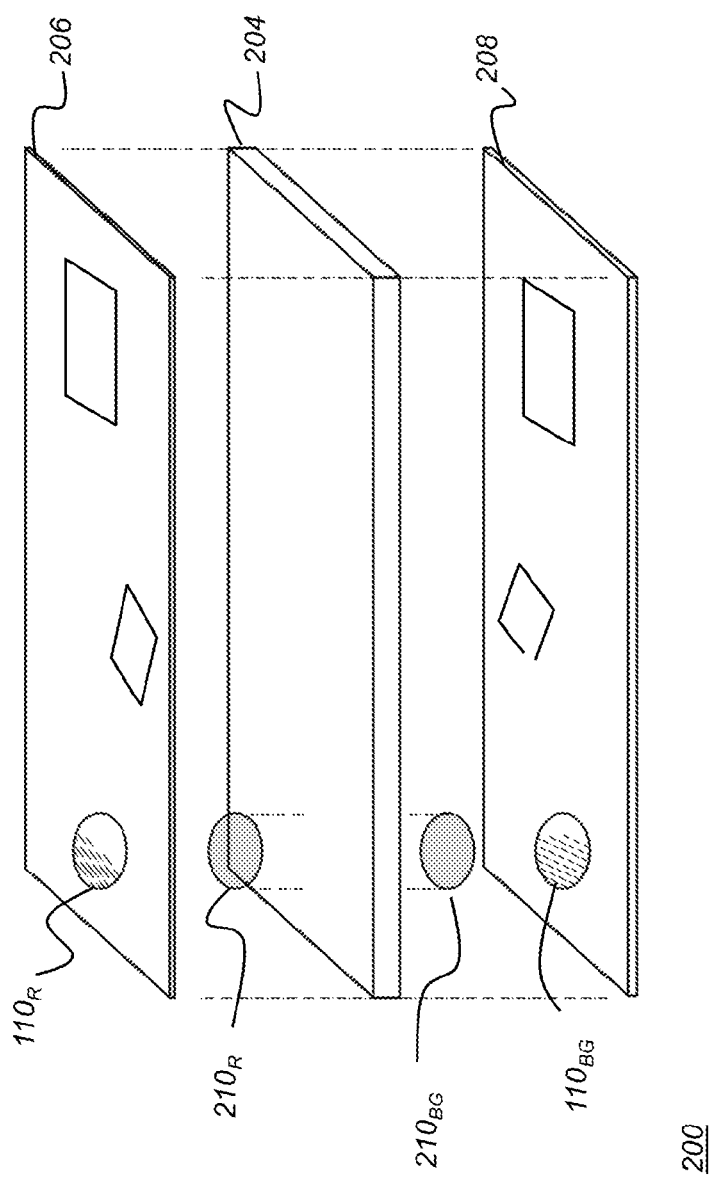
FIG. 8A is a perspective exploded view that shows a light guide formed as a multilayer structure.
Figure 8B:
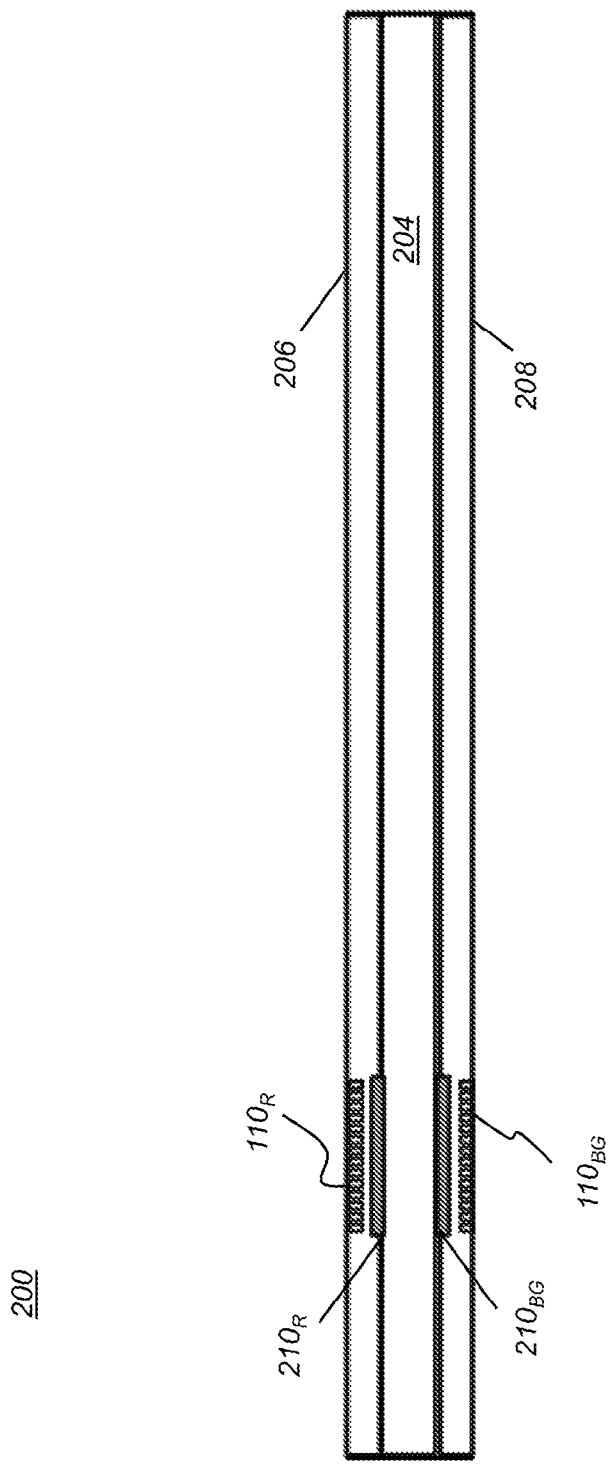
FIG. 8B is a cross-sectional side view that shows the light guide formed as a multilayer structure.

The perspective view of FIG. 8A and cross-sectional view of FIG. 8B show a double-sided imaging light guide 200 that is formed as a multilayer structure having a waveguide substrate 204 and opposing top and bottom coating layers 206 and 208, respectively. Layers 206 and 208 can be formed from an optical polymer, for example. The various in-coupling 110, out-coupling 120, and turning grating TG components for each of the two color channels are formed on different surfaces of the multilayer structure. Sandwiched between the facing in-couplings that are formed on the top and bottom coating layers 206 and 208 are dichroic patches $210_{BG}$, and $210_R$, configured for handling light in the different color channels $C_{BG}$ and $C_R$. Each dichroic patch $210_{BG}$ and $210_R$ extends over a small portion of the substrate surface. Each dichroic patch $210_{BG}$ and $210_R$ is sized to extend over the area of the surface that lies between its corresponding in-coupling diffractive optic $110_R$ or $110_{BG}$ and waveguide substrate layer 204. The dichroic patches $210_{BG}$ and $210_R$ are opaque, so that extending their size beyond the area of the in-coupling optics would tend to obstruct the field of view.

The side view of FIG. 9A shows a filter characteristic for dichroic patches $210_{BG}$ and $210_R$ handling light of the red color channel $C_R$.

Figure 9C:
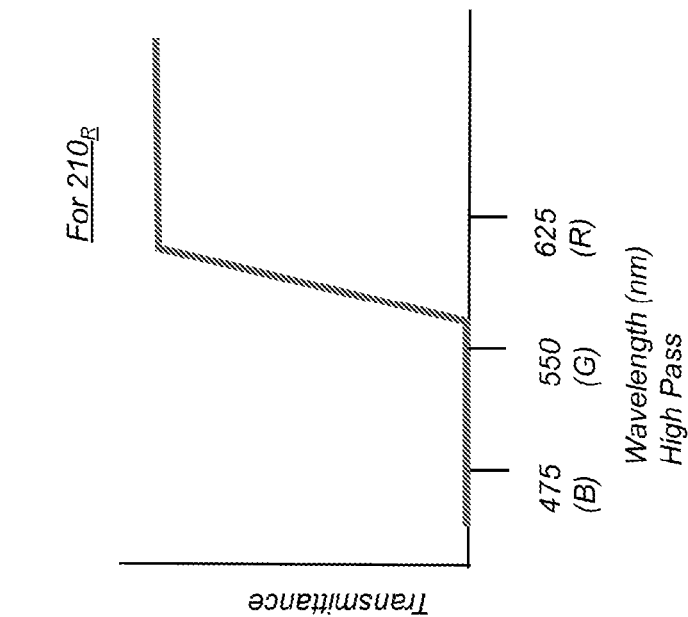
FIG. 9C is a graph showing a characteristic transmittance curve that shows the behavior of the other dichroic coating of the imaging light guide.
Figure 9B:
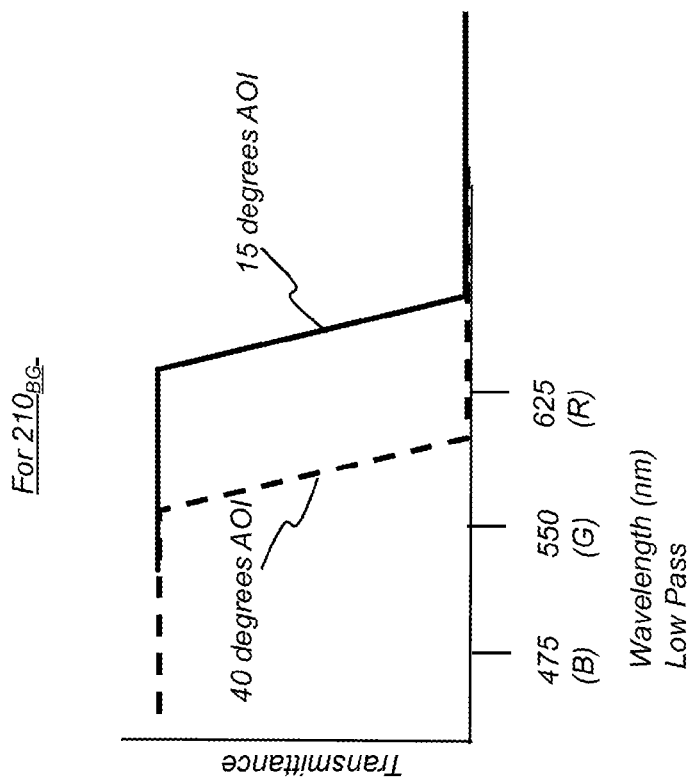
FIG. 9B is graph showing a characteristic transmittance curve that shows the behavior of one dichroic coating of the light guide.

FIG. 9B presents a filter characteristic curve showing dichroic filter transmittance with respect to incident light for first dichroic patch $210_{BG}$. At less than 15 degrees incidence, the red light is transmitted through dichroic patch $210_{BG}$. At greater than 40 degrees incidence, however, as indicated by a dashed line, the red light is reflected from dichroic patch 210BG. Blue-green light is always transmitted.

FIG. 9C presents a filter characteristic curve that shows transmittance behavior of the dichroic coating of second dichroic patch $210_R$. Red light incident at any angle from 0 to 40 degrees always transmits through dichroic patch $210_R$. Blue-green light is always reflected.

Figure 10:
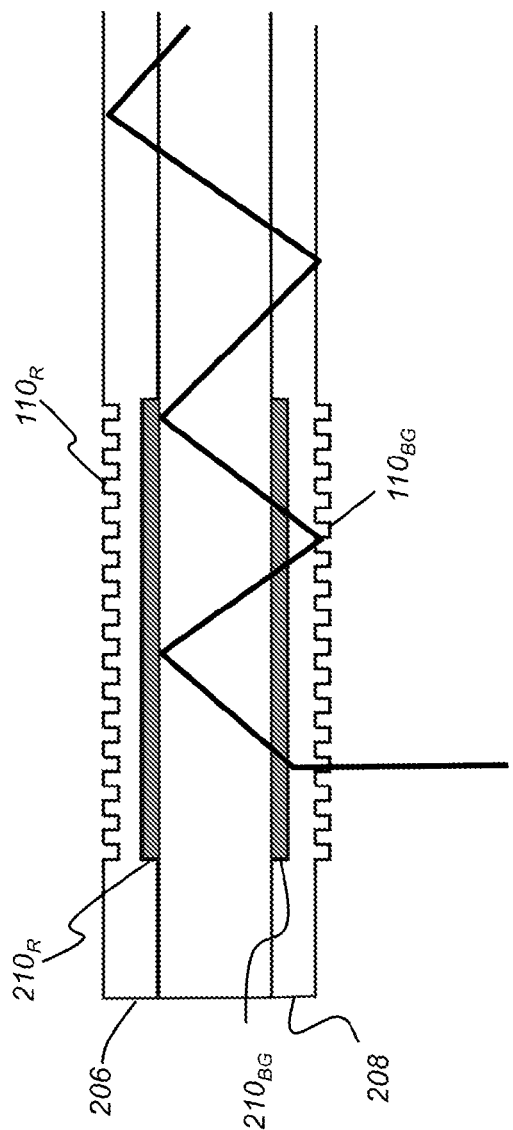
FIG. 10 is a side view that shows the input end of the light guide managing a blue-green color channel by dichroic patches.

The side view of FIG. 10 shows how dichroic patches $210_{6G}$ and $210_R$ handle light of the blue-green color channel $C_{BG}$. Blue-green light incident at any angle always reflects from dichroic patch $210_R$. Blue-green light transmits through dichroic patch $210_{6G}$.

Figure 11:
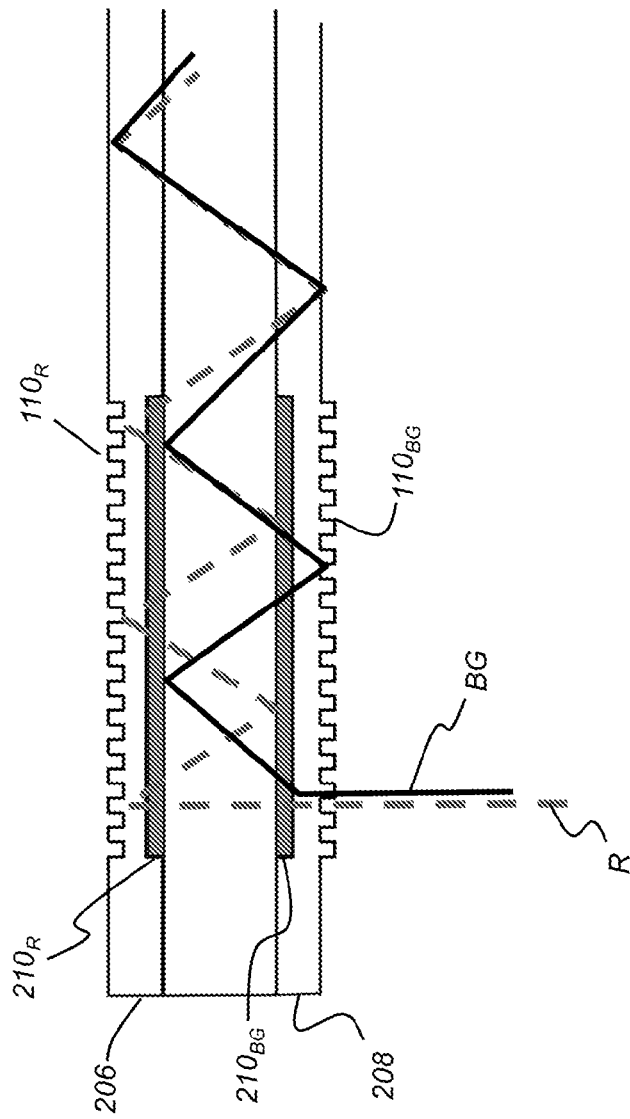
FIG. 11 is a side view that shows the input end of the light guide managing the combined behaviors of the input couplings and dichroic coatings for both color channels.

FIG. 11 combines the results provided by dichroic patches $210_{BG}$ and $210_R$ at the in-couplings. The positions of dichroic patches $210_{BG}$ and $210_R$ could be reversed with respect to the incident light, so that the incident light first encounters dichroic patch $210_R$, for example. This would require corresponding changes in dichroic coating characteristics and color channel component placement using the basic arrangement described for the example of FIG. 11.

Figure 12:
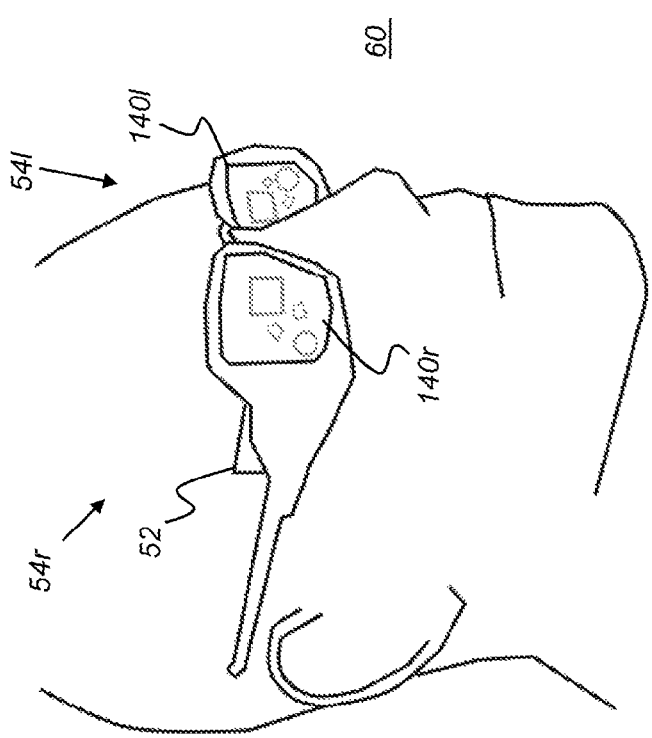
FIG. 12 is a perspective view that shows a display system for augmented reality viewing using imaging light guides of the present disclosure.

The perspective view of FIG. 12 shows a display system 60 for three-dimensional (3-D) augmented reality viewing using imaging light guides of the present disclosure. Display system 60 is shown as an HMD with a left-eye optical system 54*l* having a beam expander 140*l* for the left eye and a corresponding right-eye optical system 54*r* having a beam expander 140*r* for the right eye. An image source 52, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided.

Imaging Light Guide Fabrication

Various processes can be used to fabricate and assemble the imaging light guide, as shown in the exploded view of FIG. 8A.

Dichroic filters are a type of thin-film interference filter, which are treated or formed to provide a wavelength-selective filter characteristic as a result of the interference effects that take place between incident and reflected waves at boundaries between interleaved layers of materials having different refractive indices. Interference filters conventionally include a dielectric stack composed of multiple alternating layers of two or more dielectric materials having different refractive indices. In a conventional thin-film interference filter, each of the respective interleaved layers of the filter stack deposited on the substrate is very thin, e.g., having an optical thickness (physical thickness times the refractive index of the layer) on the order of one-quarter wavelength of light. A filter having a filter characteristic with reflection of at least one band of wavelengths and transmission of at least a second band of wavelengths immediately adjacent to the first band, such that the filter enables separation of the two bands of wavelengths by redirecting the reflected band, is conventionally called a "dichroic" filter.

Optical filters formed or configured according to embodiments of the present disclosure can generally employ the basic structure of a thin film interference filter. In this basic structure, a plurality of extremely thin discrete layers of material are deposited onto a surface of a substrate in some alternating or otherwise interleaved pattern as a filter stack, wherein the optical index between individual layers in the filter stack changes abruptly, rather than continuously or gradually. The plurality of layers include at least a number of first layers having a first refractive index $n_L$ interleaved with a number of second layers having a second refractive index $n_H$ that is greater than the first refractive index. One or more additional layers having refractive indices not equal to either $n_H$ or $n_L$ can also be in the filter stack. In conventional thin film designs, two discrete layers are alternated, formed with thicknesses very near the quarter-wavelength thickness of some fundamental wavelength. The addition of a third material or other additional materials in the thin film stack helps to fine-tune filter response. The numerical differences between the index of refraction in the high and low index of refraction materials affects the number of thin film layers required for forming a filter with a particular transmittance characteristic. Where the difference between the indices of refraction of the high and low index materials is large enough, fewer alternating layers are needed for achieving the same transmittance (density) values.

A wide variety of materials can be used to form the plurality of discrete material layers in the filter stack. Among such materials, non-limiting mention is made of metals, metallic and non-metallic oxides, transparent polymeric materials, and so-called "soft" coatings, such as sodium aluminum fluoride ($Na_3AlF_6$) and zinc sulfide (ZnS). Further non-limiting mention is made of metallic oxides chosen from silicon dioxide ($SiO_2$), tantalum pentoxide ($Ta_2O_5$), niobium pentoxide ($Nb_2O_5$), hafnium dioxide ($HfO_2$), titanium dioxide ($TiO_2$), and aluminum pentoxide ($Al_2O_5$). The interleaved material layers may include at least two distinct materials. As a non-limiting example, the filters according to the present disclosure can include a plurality of distinct alternating $Nb_2O_5$ and $SiO_2$ layers, which have indices of refraction of 2.3 and 1.5, respectively. Alternatively, filters in accordance with the present disclosure may use an interleaved pattern with at least three distinct materials, such as distinct $Nb_2O_5$, $SiO_2$, and $Ta_2O_5$ layers, each layer having a characteristic index of refraction. Of course, more than three materials and other combinations of materials may also be used within the interleaved layer pattern.

Generally, the filters in accordance with the present disclosure can be manufactured using deposition methods and techniques that are well known to those skilled in the optical coatings art. For example, these filters may be made with a computer controlled ion beam sputtering system, capable of depositing a plurality of discrete alternating material layers, wherein the thickness of each layer may be precisely controlled.

Referring back to FIG. 8A and particularly to the depicted coatings 206 and 208, an embodiment of the present disclosure uses UV embossing to form each thin polymer layer that extends over at least a portion of the top and bottom surfaces of the waveguide substrate layer 204. To form the diffractive optics, a quartz mold having an etched pattern can be used to transfer its patterning onto to the polymer as the polymer sets under UV light. Alternately, the diffraction components can be formed on one or both outer surfaces of the waveguide guide substrate S using nano-imprinting methods, for example. The coatings 206 and 208 can also be formed as or applied as films.

In-coupling diffractive optics 110 and out-coupling diffractive optics 120 can be diffraction gratings or formed as volume holograms, or formed from a holographic polymer dispersed liquid crystal, for example. At least one of the in-coupling and out-coupling diffractive optics can be a surface relief diffraction grating. The waveguide substrate of the imaging light guide is a transparent optical material, typically glass or optical polymer material with sufficient index of refraction for supporting TIR transmission between in-coupling diffractive optic, turning grating, and out-coupling diffractive optic.

In-coupling diffractive optics 110, turning gratings TG, and out-coupling diffractive optics 120 have different grating periods appropriate to their respective color channels. Typically the grating pitch, or grating period, is a value from 75 to about 90 percent of the central wavelength for a color channel. For example, the in-coupling diffractive optic $110_R$ for the red channel (620-670 nm), in an exemplary embodiment, has a period of 510 nm, a depth of 205 nm, 50/50 fill, and a 45-degree slant.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging light guide comprising:
 a waveguide formed as a substrate having a first surface with a first surface coating and a second surface, opposite the first surface and having a second surface coating;
 a first in-coupling diffractive optic formed on the first surface coating and oriented to direct a first beam of diffracted light of a first wavelength range into the waveguide along a first direction;
 a second in-coupling diffractive optic formed on the second surface coating and oriented to direct a second beam of diffracted light of a second wavelength range into the waveguide along a second different direction;
 a first dichroic patch located between the first surface of the substrate and the first surface coating and formed to:
  (i) transmit light of the first wavelength range,
  (ii) transmit light of the second wavelength range through a limited range of incidence angles, and
  (iii) reflect light of the second wavelength range through a higher range of incidence angles; and
 a second dichroic patch located between the second surface of the substrate and the second surface coating and formed to transmit light of the second wavelength range and reflect light of the first wavelength range.

2. The imaging light guide of claim 1 wherein the first dichroic patch forms a high wavelength pass filter and the second dichroic patch forms the low wavelength pass filter.

3. The imaging light guide of claim 1 further comprising: a first turning diffractive optic along a path in the first direction and disposed to redirect the first beam of diffracted light toward a first out-coupling diffractive optic, and a second turning diffractive optic along a path in the second direction and disposed to redirect the second beam of diffracted light toward a second out-coupling diffractive optic.

4. The imaging light guide of claim 3 wherein the first in-coupling diffractive optic and the second in-coupling diffractive optic are aligned along a common normal to the first and second surfaces of the substrate, and wherein the first turning diffractive optic and the second turning diffractive optic are not aligned along a common normal to the first and second surfaces of the substrate.

5. The imaging light guide of claim 4 wherein the first out-coupling diffractive optic and the second out-coupling diffractive optic are aligned along a common normal to the first and second surfaces of the substrate.

6. The imaging light guide of claim 1 wherein the substrate is an optical glass or plastic and the first surface coating is a polymer.

7. The imaging light guide of claim 1 wherein the first in-coupling diffractive optic is a volume hologram.

8. The imaging light guide of claim 1 wherein the first in-coupling diffractive optic is a diffraction grating.

9. The imaging light guide of claim 1 in which the substrate is a planar substrate.

10. The imaging light guide of claim 1 in which the first dichroic patch transmits light of the second wavelength range at incidence angles less than about 15 degrees.

11. The imaging light guide of claim 1 in which the first dichroic patch reflects light of the second wavelength range at incidence angles that supports total internal reflection along the waveguide.

12. The imaging light guide of claim 1 further comprising: a first turning diffractive optic in the path of the first direction and disposed to redirect the first beam of diffracted light toward the first out-coupling diffractive optic, wherein both the first out-coupling diffractive optic and the first turning diffractive optic are formed in the first surface coating; and a second turning diffractive optic in the path of the second direction and disposed to redirect the second beam of diffracted light toward the second out-coupling diffractive optic, wherein both the second out-coupling diffractive optic and the second turning diffractive optic are formed in the second surface coating.

* * * * *